UNITED STATES PATENT OFFICE.

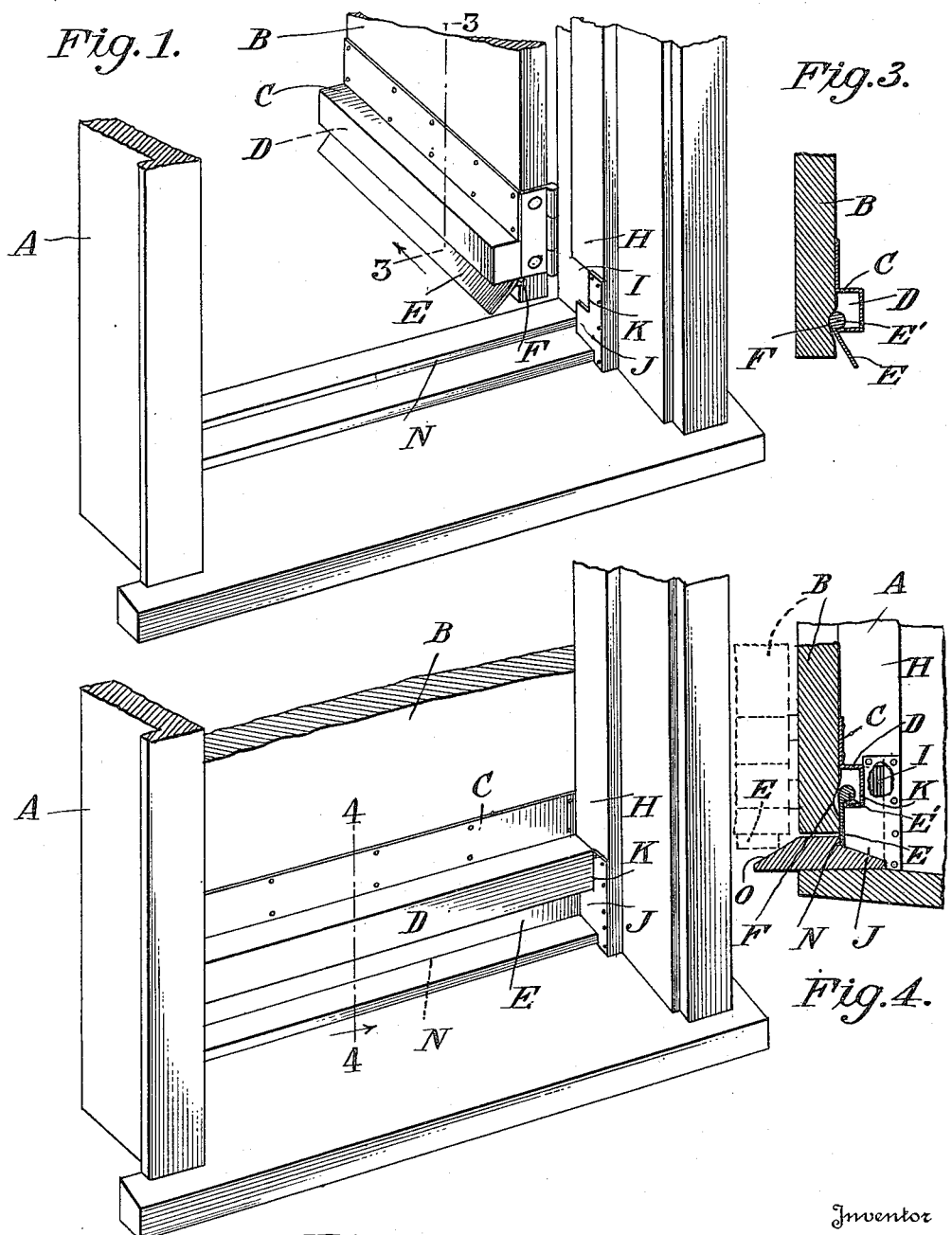

WILLIAM LAYTON, OF SEAGIRT, NEW JERSEY.

WEATHER-STRIP.

1,204,285.  Specification of Letters Patent.  Patented Nov. 7, 1916.

Application filed December 15, 1915. Serial No. 66,977.

*To all whom it may concern:*

Be it known that I, WILLIAM LAYTON, a citizen of the United States, residing at Seagirt, in the county of Monmouth and State of New Jersey, have invented certain new and useful Improvements in Weather-Strips; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in weather strips and consists of a simple and efficient device of this nature which may be easily and quickly applied to a door which will be automatically thrown so as to make a tight joint when the door is closed.

My invention is illustrated in the accompanying drawings, in which:

Figure 1 is a perspective view of a door and frame showing the weather strip applied thereto, the door being opened. Fig. 2 is a similar view showing the door closed. Fig. 3 is a sectional view on line 3—3 of Fig. 1, and Fig. 4 is a sectional view on line 4—4 of Fig. 2.

Reference now being had to the details of the drawings by letter, A designates the frame of the door and B a door hinged thereto. A casing, designated by letter C, is fastened to the face of the door and has a pocket D extending preferably its length. A weather strip E, of any suitable material, has a laterally extending cylindrical portion E' at its inner end which is adapted to be mounted in said pocket and also in a transverse grooved portion F formed in the inner face of the door, the weather strip having a swinging movement intermediate the lower edge of the pocket and the door. A side H of the frame is recessed away as at I and a sheet of material is fastened to said side and has a recess K therein to receive one end of said pocket. Said material has a flexible disconnected portion J which is in the path of one end of the weather strip when the door is closed and against which the edge of said weather strip engages and it thus serves to make a tight joint by forcing the weather strip into engagement with the shoulder N of the sill which is hereinafter described. It will be noted that a shoulder N is formed at the rear edge of the sill and behind which the weather strip drops when the door is closed, thus affording a tight joint.

The forward portion of the threshold is inclined as at O and against which the free edge of the weather strip contacts when the door swings closed, thus causing the weather strip to move vertically within the pocket, allowing the door to swing to a closed position and, after the weather strip passes by the shoulder, said strip will fall by gravity. On the opening of the door, the cylindrical portion of the weather strip will make a partial rotary movement within the pocket and groove in the door, allowing the weather strip to freely pass over the shoulder without interference.

As clearly shown in Fig. 4, when the door is in its closed position, the upper edge of the weather strip E wedges between the upper edge of the grooved portion F and the inturned portion of the casing C, thereby holding the weather strip against movement by means other than the actuation of the door.

What I claim to be new is:—

In combination with a sill having the side over which the door travels inclined, and having a shoulder on its opposite side, a door having a transverse groove adjacent its lower end, a casing having an inturned end terminating directly over the transverse groove, a weather strip having a laterally extending cylindrical portion supported within the casing and capable of pivoting in the groove so that the weather strip may swing up as the door opens or may move vertically over the inclined surface of the sill as the door closes and fall behind the shoulder, causing a binding action between the inturned edge of the casing and upper edge of the transverse groove when the door is moved to a closed position.

In testimony whereof I hereunto affix my signature in presence of two witnesses.

WILLIAM LAYTON.

Witnesses:
GARRET A. CURTIS,
GORDON PATTERSON.

Copies of this patent may be obtained for five cents each, by addressing the "Commissioner of Patents, Washington, D. C."